US011755504B2

(12) United States Patent
Dobbs et al.

(10) Patent No.: US 11,755,504 B2
(45) Date of Patent: *Sep. 12, 2023

(54) MULTIPROCESSOR SYSTEM WITH IMPROVED SECONDARY INTERCONNECTION NETWORK

(71) Applicant: Coherent Logix, Incorporated, Austin, TX (US)

(72) Inventors: Carl S. Dobbs, Austin, TX (US); Michael R. Trocino, Austin, TX (US)

(73) Assignee: Coherent Logix, Incorporated, Austin, TX (US)

( * ) Notice: Subject to any disclaimer, the term of this patent is extended or adjusted under 35 U.S.C. 154(b) by 578 days.

This patent is subject to a terminal disclaimer.

(21) Appl. No.: 16/928,611

(22) Filed: Jul. 14, 2020

(65) Prior Publication Data
US 2020/0341914 A1    Oct. 29, 2020

Related U.S. Application Data

(63) Continuation of application No. 16/252,827, filed on Jan. 21, 2019, now Pat. No. 10,747,689, which is a
(Continued)

(51) Int. Cl.
*G06F 13/40*      (2006.01)
*G06F 13/16*      (2006.01)
(Continued)

(52) U.S. Cl.
CPC ........ *G06F 13/1652* (2013.01); *G06F 9/4401* (2013.01); *G06F 13/362* (2013.01);
(Continued)

(58) Field of Classification Search
CPC ............. G06F 13/1652; G06F 13/362; G06F 13/4022; G06F 13/4027; G06F 13/4068; G06F 13/4282
(Continued)

(56) References Cited

U.S. PATENT DOCUMENTS 5,123,109 A * 6/1992 Hillis ................. G06F 15/8023
712/22
5,590,284 A   12/1996 Crosetto
(Continued)

FOREIGN PATENT DOCUMENTS

CN    101479704 A    7/2009
CN    102461264 A    5/2012
(Continued)

OTHER PUBLICATIONS

Extended European Search Report for EP Application No. 19195487.4, dated Mar. 12, 2020, 8 pgs.
(Continued)

*Primary Examiner* — Titus Wong
(74) *Attorney, Agent, or Firm* — Kowert, Hood, Munyon, Rankin & Goetzel, P.C.

(57) ABSTRACT

Embodiments of a multiprocessor system are disclosed that may include a plurality of processors interspersed with a plurality of data memory routers, a plurality of bus interface units, a bus control circuit, and a processor interface circuit. The data memory routers may be coupled together to form a primary interconnection network. The bus interface units and the bus control circuit may be coupled together in a daisy-chain fashion to form a secondary interconnection network. Each of the bus interface units may be configured to read or write data or instructions to a respective one of the plurality of data memory routers and a respective processor. The bus control circuit coupled with the processor interface circuit may be configured to function as a bidirectional bridge between the primary and secondary networks. The bus control circuit may also couple to other interface circuits and arbitrate their access to the secondary network.

20 Claims, 7 Drawing Sheets

Related U.S. Application Data continuation of application No. 15/437,343, filed on Feb. 20, 2017, now Pat. No. 10,185,672, which is a continuation of application No. 15/043,905, filed on Feb. 15, 2016, now Pat. No. 9,612,984, which is a continuation of application No. 14/086,648, filed on Nov. 21, 2013, now Pat. No. 9,292,464.

(60) Provisional application No. 61/736,851, filed on Dec. 13, 2012.

(51) Int. Cl.
| | | |
|---|---|---|
| *G06F 15/173* | (2006.01) | |
| *G06F 15/78* | (2006.01) | |
| *G06F 13/362* | (2006.01) | |
| *G06F 9/4401* | (2018.01) | |
| *G06F 13/42* | (2006.01) | |

(52) U.S. Cl.
CPC ...... *G06F 13/4022* (2013.01); *G06F 13/4027* (2013.01); *G06F 13/4068* (2013.01); *G06F 13/4282* (2013.01); *G06F 15/17381* (2013.01); *G06F 15/7817* (2013.01); *G06F 15/7882* (2013.01); *Y02D 10/00* (2018.01)

(58) Field of Classification Search
USPC ......................................... 710/306, 313, 316
See application file for complete search history.

(56) References Cited

U.S. PATENT DOCUMENTS

| | | | | |
|---|---|---|---|---|
| 5,598,408 | A | * | 1/1997 | Nickolls ........... G06F 15/17393 370/380 |
| 6,131,135 | A | | 10/2000 | Abramson et al. |
| 6,247,100 | B1 | | 6/2001 | Drehmel et al. |
| 6,304,568 | B1 | | 10/2001 | Kim |
| 6,920,627 | B2 | | 7/2005 | Blodget |
| 6,961,782 | B1 | * | 11/2005 | Denneau ........... G06F 15/17337 370/380 |
| 7,415,594 | B2 | | 8/2008 | Doerr |
| 7,649,845 | B2 | | 1/2010 | Mukherjee |
| 7,930,464 | B2 | | 4/2011 | Rankin |
| 8,228,930 | B1 | | 7/2012 | Kim |
| 8,285,789 | B2 | | 10/2012 | Abts |
| 8,726,064 | B2 | * | 5/2014 | Bennett .............. G06F 13/4243 710/316 |
| 9,292,464 | B2 | * | 3/2016 | Dobbs .................. G06F 9/4401 |
| 9,612,984 | B2 | * | 4/2017 | Dobbs ................ G06F 15/7882 |
| 9,992,135 | B2 | * | 6/2018 | Khare .................... H04L 49/30 |
| 2002/0007439 | A1 | * | 1/2002 | Gharachorloo ..... G06F 12/0826 711/119 |
| 2004/0117755 | A1 | | 6/2004 | Blodget et al. |
| 2008/0089329 | A1 | | 4/2008 | Ajima |
| 2009/0172237 | A1 | * | 7/2009 | Wojciechowski .. G06F 13/4221 710/305 |
| 2011/0230978 | A1 | * | 9/2011 | Jie ........................... G06F 8/456 700/4 |
| 2012/0137119 | A1 | | 5/2012 | Doerr |
| 2012/0144142 | A1 | | 6/2012 | Taylor et al. |
| 2013/0232284 | A1 | * | 9/2013 | Akiyama .............. G06F 3/0659 710/23 |
| 2014/0164735 | A1 | * | 6/2014 | Dobbs ..................... G06F 9/522 712/30 |

FOREIGN PATENT DOCUMENTS

| | | | |
|---|---|---|---|
| EP | 0867813 | A2 | 9/1998 |
| JP | 2004-192621 | A | 7/2004 |
| JP | 2004326784 | A | 11/2004 |
| WO | 2012/051577 | A1 | 4/2012 |

OTHER PUBLICATIONS

Communication pursuant to Art. 94(3) EPC dated Nov. 27, 2020, issued by the European Patent Office in European Application No. 19195487.4, 9 pgs.

Notice of Allowance dated Sep. 7, 2021, issued by the Japanese Patent Office; Japanese Application No. 2019-186694, 4 pgs.

Japanese Application No. 2019-186694, Office Action, dated Dec. 22, 2020, 7 pgs.

* cited by examiner

MULTIPROCESSOR SYSTEM WITH IMPROVED SECONDARY INTERCONNECTION NETWORK

PRIORITY CLAIM

This application is a continuation of U.S. patent application Ser. No. 16/252,827, entitled "MULTIPROCESSOR SYSTEM WITH IMPROVED SECONDARY INTERCONNECTION NETWORK" filed on Jan. 21, 2019, which is a continuation of U.S. patent application Ser. No. 15/437,343, now U.S. Pat. No. 10,185,672, entitled "MULTIPROCESSOR SYSTEM WITH IMPROVED SECONDARY INTERCONNECTION NETWORK" filed on Feb. 20, 2017, which is a continuation of U.S. patent application Ser. No. 15/043,905, now U.S. Pat. No. 9,612,984, entitled "MULTIPROCESSOR SYSTEM WITH IMPROVED SECONDARY INTERCONNECTION NETWORK," filed on Feb. 15, 2016, which is a continuation of U.S. patent application Ser. No. 14/086,648, now U.S. Pat. No. 9,292,464, entitled "MULTIPROCESSOR SYSTEM WITH IMPROVED SECONDARY INTERCONNECTION NETWORK," filed on Nov. 21, 2013, which claims benefit of priority to provisional application No. 61/736,851 entitled "SECONDARY INTERCONNECTION NETWORK IMPROVEMENTS," filed on Dec. 13, 2012, whose disclosures are hereby incorporated by reference in their entirety as though fully and completely set forth herein.

BACKGROUND

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

Technical Field

This invention relates to multiprocessor systems and, more particularly, to an improved secondary interconnection network in a multiprocessor system having a plurality of processor elements, memories, and a primary interconnection network.

Description of the Related Art

Computer and Digital Signal Processing (DSP) Systems may be composed of multiple processing elements (PE), supporting memory (SM), data interconnection networks (IN), and input and output (I/O) interfaces. With multiple PEs available, the system may support parallel algorithms to complete tasks more quickly or to reduce the energy to complete a task. Parallel algorithms often require streaming of data at very high rates between PE and SM across the system and into and out of the system. In these systems the interconnection networks generally include at least one high bandwidth (high bit per second throughput) primary interconnection network (PIN). The PIN is optimized for high bit per second throughput of relatively large messages, but not especially low latency (point to point delivery delay).

At least one prior art multiprocessor system including a PIN has also included an additional low bandwidth secondary interconnection network (SIN). A high latency type SIN, implemented as a "serial bus" (SB) has previously been implemented on a multiprocessor IC chip referred to as the HyperX hx3100A made by Coherent Logix, Inc., the assignee of the present application. FIG. 1 illustrates the prior art serial bus (SB), also referred to as the secondary interconnection network (SIN), implemented on the HyperX hx3100A. The prior art SIN shown in FIG. 1 was designed to be embedded in a multiprocessor IC chip along with a PEs, SMs, PIN, chip I/O interfaces, power grid, and clocking network. As shown, this serial bus architecture interconnected all PEs and SMs in a long loop that meandered back and forth across the chip. This allowed the SIN to support guaranteed message delivery (GMD) with minimum area and power dissipation. The SIN was thus an on-chip serial bus (SB) first aimed at providing debug support for programmers of application and system software. In addition, the SB was capable of being used during system boot-up to load memories and perform power-on system tests. Also, the SB could be used during runtime to perform various system administration functions such as control of clock frequencies for individual PE and I/O ports, setting security barriers in the PIN, and PE message passing. Lastly, the SB could also be used in IC test and evaluation.

The prior art SIN shown in FIG. 1 had a serial bus (SB) architecture organized as a unidirectional daisy chain of links between local interface units with both ends of the chain coupled to a serial bus controller (SBC) unit. As illustrated in FIG. 1, a typical local interface unit is labeled as serial bus slave (SBS) interface unit; so called because is cannot issue commands (as described in more detail below). Each SBS interface unit is coupled to one PE, one SM unit, one SB input link, and one SB output link. Each SBS unit was assigned a unique address value so that individual messages could be sent to particular SBS units. Each SBS interface unit (SBS-IU) contained registers and logic to translate message formats between the predominately word-parallel formats of the PE and SM to the predominately bit-serial formats of the SB links. Each link between interface units was 2 parallel wires, with one wire carrying a data signal (SBDATA) and the other a clock signal (SBCLK) to capture the data at a receiver input flip-flop. The presence of a message was indicated by multiple pulses on SBCLK, one pulse for each data bit on SBDATA; and the absence of a message was indicated by a constant value on SBCLK.

In some embodiments, the SBS-IU may be configured with a buffer to receive a SB message of fixed length. Initially (upon chip reset), the SBS-IU may enter repeater mode wherein it may receive a SB message of fixed length and compare the address in the message header to its own unique address. If there is no address match, the SBS-IU may pass the message on to the next SBS-IU in the chain. In the case of an address match, the SBS-IU may enter channel mode where subsequent messages are treated as possible commands until it receives a command to return to repeater mode. The SBS-IU may be configured to decode a set of commands from properly-encoded SB messages. If an SB message is not properly encoded for one of the set of commands, then the SBS-IU ignores it. In various embodiments, the commands: Read and Write SBS-IU configuration register, (reset DMR, reset PE, set clock frequency of PE, reset I/O circuits if present, and set PIN router security barriers), Read and Write SM at a specific address or a block of addresses, Read and Write PE registers including message register under certain conditions, set PE breakpoint, force PE break, single step PE, wakeup PE (let run), and enable/disable PE participation in global break signaling. For Read commands the SBS-IU may generate a return SB message containing the read out data and sends it to the next SBS-IU in the chain. The return SB message may pass through the other SBS-IU in the chain (because they are in repeater mode); and may be forwarded by the SBC to the controller that set up the channel.

As illustrated in FIG. 1, the Serial Bus Controller (SBC) is coupled to both ends of the SB, to the Debug Access Port (DAP) Controller, and to the Boot Controller. The SBC accepts SB messages from the DAP and Boot controllers, and provides return messages back to them. The main purpose of the SBC is to prevent more than one controller at a time from gaining SB access, which may produce random mixing of commands and erroneous results. If the SB is quiescent, then either controller may initiate a channel to a SBS-IU. If a channel is already present the SBC controller will ignore any new attempts to initiate a channel until the current one ends. If two controllers attempt to initiate channels at the same time, then the SBC will arbitrate so that one gains access and the other SBC is ignored.

To permit PE 0,0, as depicted in FIG. 1, to send messages to the SBC and receive result messages back from the SBC, some registers special to DMR 0,0 are coupled to the Boot Controller. These special registers in DMR 0,0 are not accessible by the PIN, nor by any PE other than PE 0,0. When a particular register in DMR 0,0 is written by PE 0,0, a message is transferred to the SBC. Return SB message data from SBC may be copied to particular registers in DMR 0,0. The software program on PE 0,0 that makes use of the SB may need to include appropriate delays to wait for the relatively long latency of the SB message transport.

An improved secondary interconnection network (SIN) architecture is desired for use in multiprocessor systems.

SUMMARY OF THE EMBODIMENTS

Various embodiments are disclosed of a multiprocessor system including a plurality of processors, a plurality of memories, and a plurality of routers. In one embodiment, each processor has an associated memory and router, and the plurality of processors, memories and routers are coupled together in an interspersed fashion. The plurality of routers are coupled together to form a primary interconnection network. The multiprocessor system also includes a plurality of interface units, wherein each respective processor/router combination has an associated interface unit. The plurality of interface units and at least one controller are coupled together to form a secondary interconnection network (SIN). The plurality of interface units may be coupled together in a daisy-chain fashion or in multiple loops to make the secondary interconnection network. The at least one controller is coupled to other controllers and message sources outside the SIN and configured to receive message from the sources to access the SIN, return messages to the sources, and arbitrate requests from the sources to prevent SIN control errors. Multiple chains of interface units may be coupled to the SIN controller, and each chain of interface units may be configured to support unidirectional or bidirectional message flow.

A specified processor may be configured to couple to a SIN controller (also referred to herein as a "bus controller"). The specified processor has an associated specified router as well as an associated at least one specified interface unit that is coupled to the bus controller. The bus controller is configured to send data to and receive data from the at least one specified interface unit. In one embodiment, the at least one specified interface unit comprises two different specified interface units, each specified interface unit being associated with a respective processor, where one is configured to send data to the bus controller and the other is configured to read data from the controller.

The bus controller may be configured to arbitrate among requests for access to the at least one specified interface unit. In other words, the bus controller may be configured to receive requests to access the specified interface unit from different logic blocks and select one of these requests to be provided to the specified interface unit. The logic blocks which may request access to the specified interface unit may include a processor interface block as well as other blocks such as a host interface, a boot controller and a debug access port. The processor interface block is coupled to the bus controller and also coupled to the specified router associated with the at least one specified interface unit. The processor interface block is configured to allow any of a plurality of processors, or possibly all of the processors, in the multiprocessor system to use the primary interconnection network to access the secondary interconnection network through the specified router. The processor interface block may comprise one or more buffer registers for buffering secondary interconnection network messages and flow control circuits to prevent message loss or duplication. The one or more buffer registers and flow control circuits are used in enabling any processor to use the primary interconnection network to access the secondary interconnection network.

For example, the specified router may receive messages originating on the primary interconnection network. The processor interface block may receive these messages from the specified router and provide those messages to the bus controller for provision on to the secondary interconnection network. Also, the processor interface block may receive messages from the secondary interconnection network through the bus controller and provide those messages to the specified router for provision on to the primary interconnection network.

In one embodiment, any respective processor in the multiprocessor system is configurable to establish: 1) a first communication pathway on the primary interconnection network from a neighboring router of the respective processor to the specified router to create a forward path to the secondary interconnection network; and 2) a second communication pathway on the primary interconnection network from the specified router to the neighboring router of the respective processor to create a reverse path from the secondary interconnection network for full duplex communication with the secondary interconnection network.

Thus, any respective processor is operable to issue secondary interconnection network commands onto the primary interconnection network to the specified router for provision through the processor interface block and the bus controller to the secondary interconnection network. Further, any such respective processor is configured to receive result and/or message status information from the secondary interconnection network provided through the bus controller and the processor interface block to the specified router.

The bus controller may be configured to receive commands from each of two or more processors and compare the received commands and then perform an action based on the comparison. For example, if the commands are determined to match, the bus controller may be configured to send one of the commands to the secondary interconnection network. If the commands are determined to not match, the bus controller may be configured to send a message to a programmable error handler. In one embodiment, the specified processor has a separate communication path to the bus controller, and the bus controller is configured to receive commands from the specified processor and another processor. The bus controller may be configured to compare the commands received from the specified processor and the other processor and perform the actions recited above.

In some embodiments, a multichip system may comprise a plurality of the above-described multiprocessor systems implemented on different respective chips and coupled together by their respective primary interconnection networks. In this multichip system, any processor on one chip may be able to access a secondary interconnection network on any other chip in the multichip system.

A method for communication in a multiprocessor system may comprise the following steps. First a communication path may be established on the primary interconnection network from a first processor to the specified router associated with the specified processor. The specified router may be connected to the processor interface block. The first processor may then send a secondary interconnection network message through the primary interconnection network to the specified router. The specified router may then provide the secondary interconnection network message to the processor interface block, which in turn provides the message to the bus controller. The bus controller then provides the secondary interconnection network message onto the secondary interconnection network. The method is useable to enable any processor in the multiprocessor system to communicate on the secondary interconnection network.

The method may also provide for communication from the secondary interconnection network back to the first processor. This may involve establishment of a reverse communication path from the specified router to the first processor, wherein the reverse communication path is useable for providing response information from the secondary interconnection network back to the first processor. The communication method may comprise the bus controller receiving response information from the secondary interconnection network and providing the response information to the processor interface block. The response information may be buffered in the processor interface block. The processor interface block may then provide the response information to the specified router, which then provides the response information to the first processor over the reverse communication path.

Figure 1:
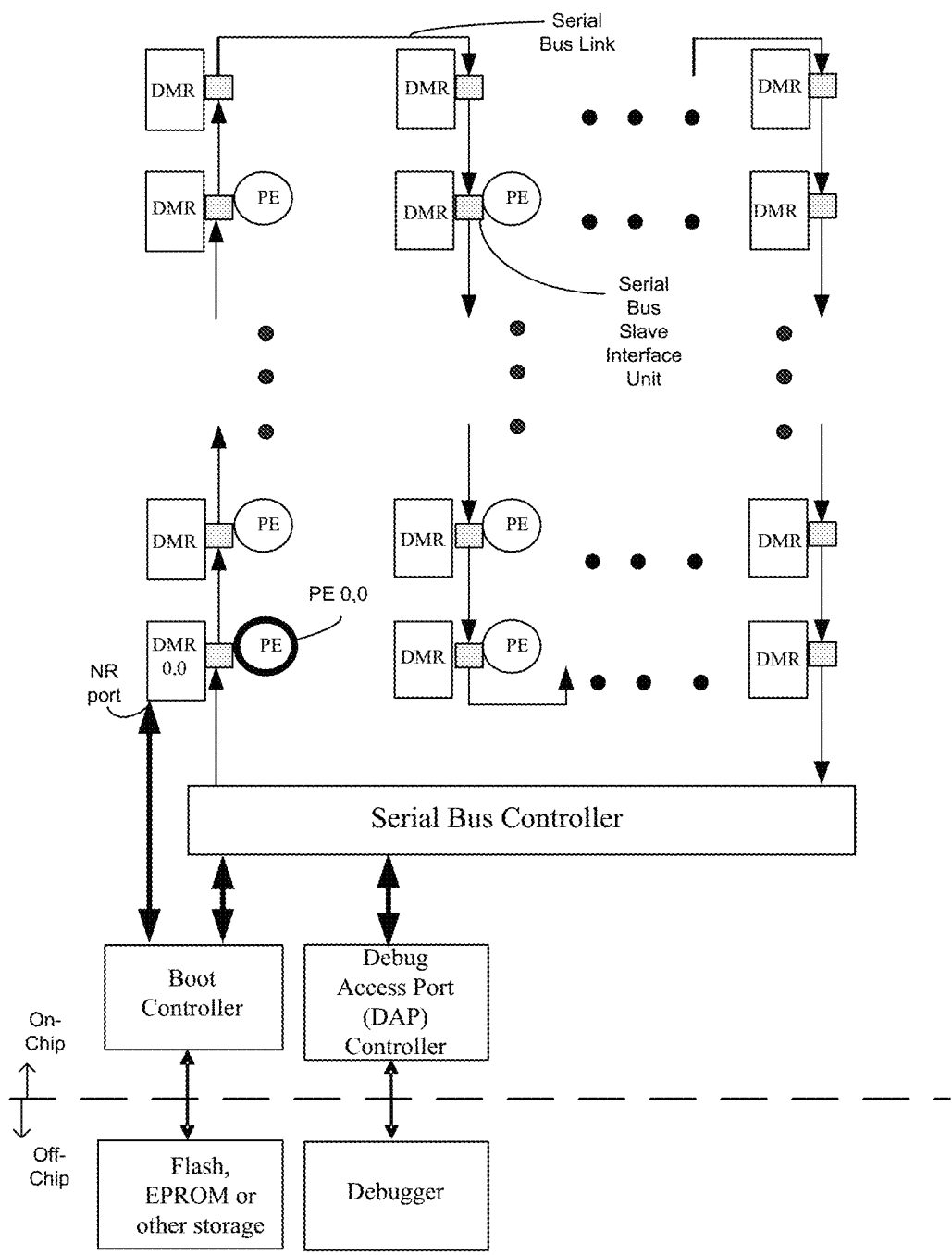
FIG. 1 is a block diagram of a prior art secondary interconnection serial bus for a multiprocessor system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph six interpretation for that unit/circuit/component. More generally, the recitation of any element is expressly intended not to invoke 35 U.S.C. § 112, paragraph six interpretation for that element unless the language "means for" or "step for" is specifically recited.

DETAILED DESCRIPTION OF EMBODIMENTS

Incorporation by Reference

U.S. Pat. No. 7,415,594 titled "Processing System With Interspersed Stall Propagating Processors And Communication Elements" whose inventors are Michael B. Doerr, William H. Hallidy, David A. Gibson, and Craig M. Chase is hereby incorporated by reference in its entirety as though fully and completely set forth herein.

U.S. patent application Ser. No. 13/274,138, titled "Disabling Communication in a Multiprocessor System", filed Oct. 14, 2011, whose inventors are Michael B. Doerr, Carl S. Dobbs, Michael B. Solka, Michael R Trocino, and David A. Gibson is hereby incorporated by reference in its entirety as though fully and completely set forth herein.

Terms

Hardware Configuration Program—a program consisting of source text that can be compiled into a binary image that can be used to program or configure hardware, such as an integrated circuit, for example.

Computer System—any of various types of computing or processing systems, including a personal computer system (PC), mainframe computer system, workstation, network appliance, internet appliance, personal digital assistant (PDA), grid computing system, or other device or combinations of devices. In general, the term "computer system" can be broadly defined to encompass any device (or combination of devices) having at least one processor that executes instructions from a memory medium.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Interconnection Networks on Multiprocessor Systems

Figure 2:
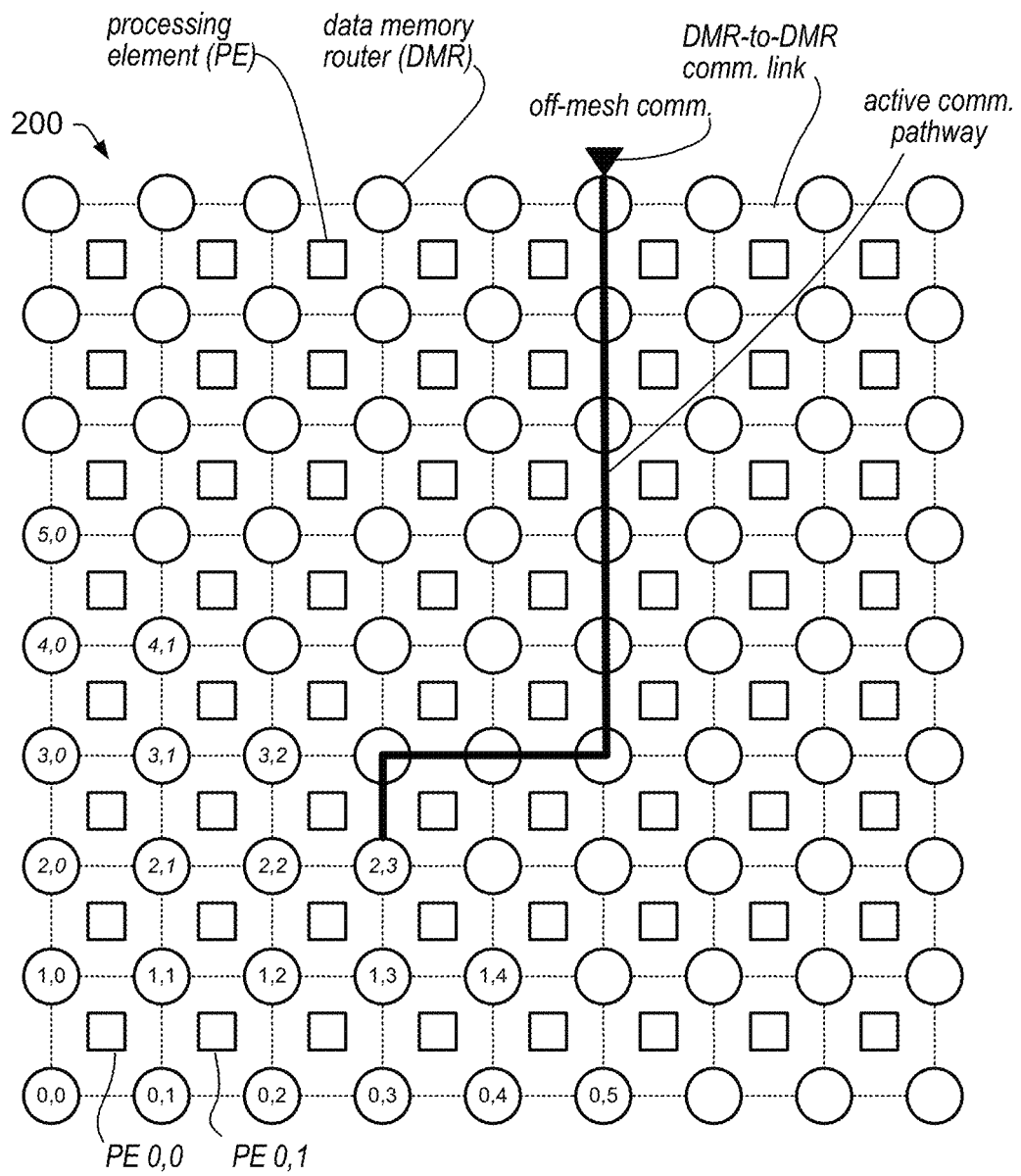
FIG. 2 is a block diagram illustrating an embodiment of a multiprocessor system, including a primary interconnection network.

FIG. 2 illustrates a multiprocessor system composed of multiple processors, also referred to as processing elements (PE), data memory routers (DMRs), also referred to as supporting memory (SM), a primary interconnection network (PIN), a secondary interconnection network (SIN) (not shown), and input and output (I/O) interfaces. As shown, the squares in the figure represent processors (or processing elements) and the circles represent data memory routers (DMRs). The data memory routers comprise a router and a memory, wherein the memory may be referred to as "support memory" (SM). The router and its associated memory may be considered as separate independent units, or alternatively may be considered as a combined data memory router. Each processor (PE) is connected to four neighboring DMRs, although this connectivity is not shown in the figure for ease of illustration. The connections between the DMRs, referred to as the DMR-to-DMR links, form a primary interconnection network (PIN) which allows communication in the multiprocessor system between the various processors. As shown, the plurality of processors, the plurality of memories and the plurality of routers are coupled together in a interspersed fashion. Although not shown in FIG. 2 (but shown in FIG. 3), the multiprocessor system includes a plurality of interface units, wherein each interface unit is coupled to a respective processor (PE) and a respective router (DMR). The plurality of interface units are coupled together to form a secondary interconnection network (SIN). As discussed further below, the multiprocessor system includes an improved architecture which allows any of the processors (at least a plural subset of the processors) to communicate with the SIN.

With the presence of multiple processors (PEs), the multiprocessor system may support parallel algorithms to complete tasks more quickly or to reduce the energy to complete a task. Parallel algorithms often require streaming of data at very high rates between PE and SM across the system and into and out of the system. The primary interconnection network (PIN) is preferably a high bandwidth (high bit per second throughput) interconnection network that is optimized for high bit per second throughput of relatively large messages, but not especially low latency (point to point delivery delay). Under conditions of light traffic loads most messages will sail through the PIN unobstructed. Under conditions of heavy traffic loads, messages may be blocked by other messages on the network. The PIN hardware may eventually deliver a blocked message after the traffic dies down and the blocking traffic goes away, but in the meanwhile the PIN may reflect a busy signal to the sender.

FIG. 2 also illustrates an example planar mesh PIN in the multiprocessor system. Using current silicon transistor IC fabrication technology, 100 or more PEs can be integrated and interconnected on a single IC chip. Systems of thousands of PEs can be made with many of these chips interconnected by advanced circuit boards and other substrates.

While parallel algorithms may be designed to minimize message blocking, they may not always eliminate it, especially in the development of application software where the algorithm is being tuned to the hardware. Generally there is a need for one or more additional low bandwidth secondary interconnection networks (SIN) of two types. One to support urgent communications at lower latency than the PIN, and the other to support configuration and debug functions with guaranteed message delivery (GMD) but with higher latency. The secondary interconnection network (SIN) may, in some embodiments, be a serial bus, and thus may be referred to herein as "serial bus" (SB).

Figure 3:
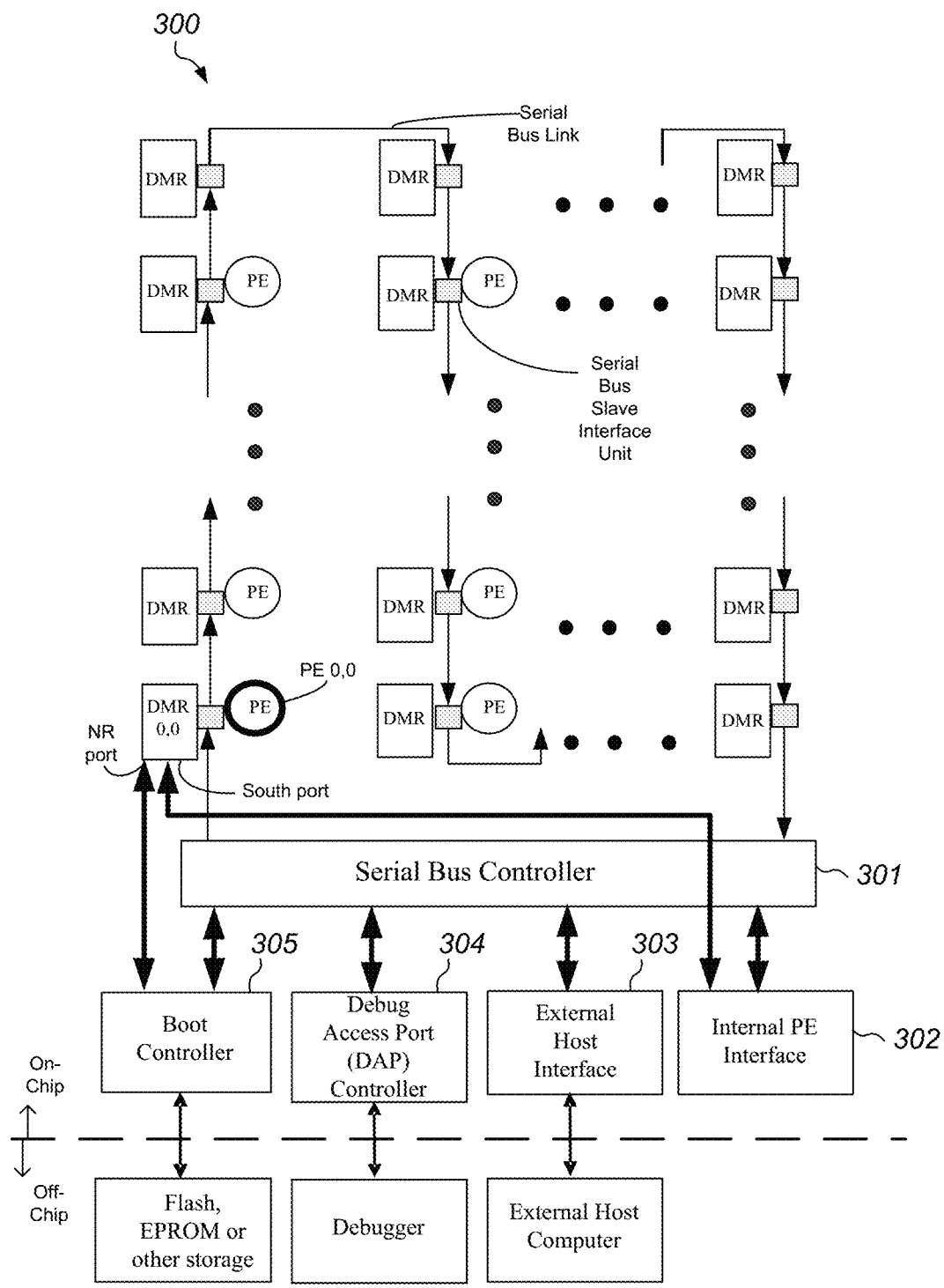
FIG. 3 is a block diagram illustrating the secondary interconnection network of the multiprocessor system.

Turning to FIG. 3, an embodiment of a secondary interconnection network (SIN) is illustrated. The SIN may be embedded in the multiprocessor system IC chip along with a plurality of processors (PEs), support memories (SMs), routers, a primary interconnection network (PIN), chip I/O interfaces, power grid, and clocking network. More specifically, as shown in FIG. 3, the multiprocessor system comprises a plurality of processors (PEs) represented by circles and a plurality of data memory routers (DMRs) represented as rectangles in FIG. 3. As also shown, the multiprocessor system includes a plurality of interface units, wherein each interface unit is coupled to a respective processor and a respective router. The interface units are represented as the small squares located between the respective processor (PE) and the respective DMR. Each interface unit may be assigned a unique address value so that individual messages may be sent to particular interface units. As shown, the plurality of interface units are coupled together to form a secondary interconnection network. More specifically, the plurality of interface units are coupled together in a daisy chain fashion to form the secondary interconnection network (SIN).

In some embodiments, the SIN may have a serial bus architecture to interconnect all PEs and SMs in a long loop that meanders back and forth across the chip. Thus one example of a SIN presented herein is an on-chip serial bus (SB). The SIN may operate to support guaranteed message delivery (GMD) with minimum area and power dissipation.

The SIN may provide debug support for programmers of application and system software. In addition, the SIN may be used during system boot-up and anytime to load memories and perform power-on system tests. Also, the SIN can be used during runtime to perform various system administration functions such as clock control management and PE message passing. Lastly, the SIN can also be used in IC test and evaluation.

In the embodiment described herein, the SIN has a serial bus (SB) architecture organized as a unidirectional daisy chain of links between local interface units with both ends of the chain coupled to a bus controller, also referred to as serial bus controller (SBC) unit, as shown in FIG. 3. In the embodiment illustrated in FIG. 3, the interface unit is labeled as serial bus slave (SBS) interface in FIG. 3. Each interface unit (SBS unit) couples to one PE, one SM unit, one SB input link, and one SB output link. As noted above, each interface unit (SBS unit) may be assigned a unique address value so that individual messages may be sent to particular SBS units. Each interface unit (SBS-IU) contains registers and logic to translate message formats between the predominately word-parallel formats of the PE and SM to the predominately bit-serial formats of the SB links.

The SB may support numerous commands. For example, in some embodiments, the SB commands may support parallel operations, such as, e.g., reset, zeroize, parallel load (instruction and/or data), wakeup PEs, force breakpoint, single step, and the like. In other embodiments, the SB may support commands that allow the readout of PE pipeline status and instruction pointer, as well as, a tamper detection reset.

Each link between interface units may be N parallel wires, with small N conserving power and large N delivering more bits per second throughput. Since throughput is not usually an issue on a SIN, a two wire (N=2) link may be used. One wire may carry a data signal (SBDATA) and the other a clock signal (SBCLK) to capture the data at a receiver input flip-flop. The presence of a message may be indicated by a square wave on SBCLK; and the absence of a message may be indicated by a constant value on SBCLK.

In a preferred embodiment, one of the processors is a specified processor, i.e., is preconfigured to couple to a bus controller, referred to as serial bus controller in FIG. 3. The specified processor also has an associated "specified router" and "specified interface unit." As shown, the specified router is connected to a processor interface unit. Accordingly, any processor (PE) in the multiprocessor system is able to communicate with the specified router to provide a request to access SIN. Thus, for example, if a processor (other than the specified processor) desires to communicate on the SIN, the processor provides a communication request to the specified router. The specified router can then forward this request to the processor interface block. The processor interface block can then forward this request to the bus controller, The bus controller is coupled to at least one specified interface unit and is configured to send data to and receive data from the at least one specified interface unit. The specified interface unit forms the "entry point" or "access point" to the SIN. Thus the bus controller is configured to pass messages received at the processor interface block to the specified interface unit and hence onto the SIN. In one embodiment, the same specified interface unit is configured for both sending and receiving data between the SIN and the bus controller. In another embodiment, a first specified interface unit is configured to receive data from the bus controller and provide it onto the SIN, and a second specified interface unit is configured to receive data from the SIN and provide the data to the bus controller.

The bus controller is configured arbitrate any conflict between access requests, granting "one-at-a-time" access to the SIN by one of the requesting specified interface units. A number of different logic blocks may be coupled to the bus controller and provide requests to the bus controller for access to the SIN. These logic blocks may include a boot controller, a debug access port (DAP) controller, an external host interface, and a processor interface block. In some embodiments, the arbitration scheme and priority used by the bus controller may be fixed while, in other embodiments, the arbitration scheme and priority may be under program control.

As noted above, the processor interface block is coupled to the bus controller and also coupled to the specified router associated with the at least one specified interface unit. The processor interface block is configured to allow any of a plurality of processors in the multiprocessor system to use the primary interconnection network, by communicating through the specified router, to access the secondary interconnection network (SIN).

Each interface unit (SBS-IU) may be composed of a serial input register, a serial output register and additional registers to buffer its other ports, and one or more state machines to translate message formats between the ports and the serial bus. When a SB command is received at a SBS-IU, the command may be tested for an initialization command. If the initialization command is not present, the SBS-IU may remain in a bypass mode. If the initialization command is present, however, the SBS-IU may compare an address associated with the command to a hard-wired address. When the address associated with the command matches the hard-wired address of the SBS-IU, the SBS-IU interprets all subsequent commands as being directed to itself until an end command is received, at which point, the SBS-IU reverts to bypass mode.

In various embodiments, the SB transceivers operate on the same core master clock as the DMRs, to prevent timing problems when performing an access to the DMR memory or registers. However, in some embodiments, a PE may be allowed to operate on a slower clock, potentially mis-latching data moving between SBC-IU and PE. In such cases, the PE may be temporarily switched to the master clock for the duration of any data transfers with the SBC-IU.

Communication on the SIN may be accomplished using short messages of fixed bit lengths by employing shift registers with parallel input and output. A message with a fixed length of M bits is easily captured in or sent from a shift register of the same length, although longer registers may be used, and combinations of shorter registers totaling M bits or more may be used. A transmitter may have an output shift register with output coupled to SBDATA and a shift clock coupled to SBCLK. The transmitter parallel loads its output shift register and then turns on the shift clock to send out the message, stopping after M bits. A receiver may have an input shift register with its data input coupled to SBDATA and an input clock coupled to SBCLK. After M bits have arrived the input shift register may be read out in parallel and this data may be decoded for command codes, addresses, block data sizes, and data. The use of fixed length messages and shift registers is only an example, and other message formats may be used instead.

If a message received at a particular interface unit (SBS-IU) does not contain a command addressed to it then the interface unit (SBS-IU) may ignore the message and relay it to the next interface unit (SBS-IU) in the chain. If a command is addressed to the SBS-IU or is a broadcast command, then the SBS-IU may simply do the indicated action. If a command requires a response message, the SBS-IU may generate a message and send it to the next SBS-IU in the daisy chain; where after passing through many SBS-IUs it will emerge back at the serial bus controller (SBC) for relay to a controller waiting for it. Messages originating from an SBS-IU may be the same fixed-length message format as a message from the SBC, the difference being that the destination address is the SBC address.

As shown in FIG. 3 and as noted above, the bus controller (SBC) is coupled to a Boot Controller (BC), a Debug Access Port (DAP) controller, an External Host Interface (EHI) and the processor interface block (Internal PE Interface). In addition the specified processor has an access path through the specified DMR to the Boot Controller and then back into the bus controller (SBC). Each of these master controllers (Boot Controller, Debug Access Port Controller, External Host Interface, and processor interface block, may request access to the SIN. Each master provides properly formatted messages to the bus controller (SBC), which may or may not detect message format errors.

As noted above, the SIN bus topology shown in FIG. 3 includes a pathway to access the bus controller. This pathway goes from the south port of the specified DMR (DMR 0,0) through the processor interface block. This pathway is for use by any internal PE. The purpose of the processor interface block, or Internal PE Interface (IPEI), is to provide buffer registers for SIN messages, and thereby allow any PE in the system to use the PIN to access the SIN through the south port of the specified DMR (DMR 0,0). In order for any processor to communicate on the SIN, the subject PE establishes a communication pathway on the PIN in the usual way from one of its neighboring DMRs to the specified DMR (DMR 0,0); and then provides return path information for creation of a reverse path for full duplex communication. After establishing the forward and reverse pathways the subject PE may issue SIN commands and receive results and message status information back from the bus controller.

Figure 4:
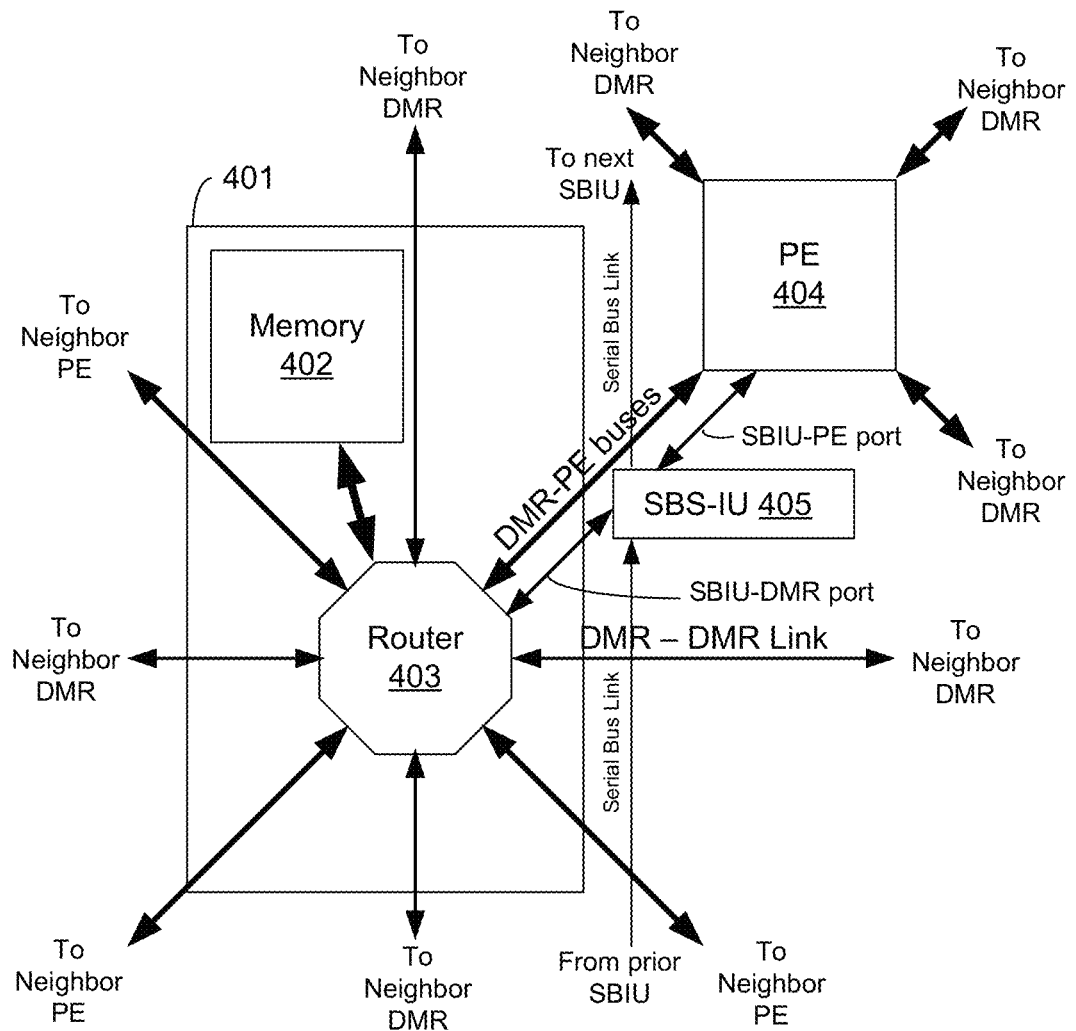
FIG. 4 is a block diagram of an embodiment of a router and its associated processor, memory and interface unit.

An embodiment of a DMR and its associated processor, memory, and interface unit is illustrated in FIG. 4. In the illustrated embodiments, DMR 401 includes memory 402, and router 403. Memory 402 is coupled to router 403, which is, in turn, coupled to PE 404, and Serial Bus Slave (SBS) 405.

Router 401 may be coupled to neighboring DMRs as well as neighboring PEs. Additionally, router 401 may be coupled to memory 402 and SBS 405. In some embodiments router 401 may include a crossbar switch which may be configured to selectively send received packets of data to one of the coupled devices, such as, e.g., PE 404. Router 401 may, in other embodiments, be configured to send and receive data packets between multiple layers of a PIN.

Memory 402 may be designed in accordance with one of various design styles. In some embodiments, memory 402 may include multiple Static Random Access Memory (SRAM) cells or any other suitable storage circuit. For example, memory 402 may include latches or flip-flop circuits arranged as a register file.

In some embodiments, SBS 405 may be coupled to router 403 and PE 404 via dedicated ports. Additionally, SBS 405 may also be coupled other SBS units to form the aforementioned daisy chain connection. SBS 405 may, in various embodiments, include a serial input register and a serial output register that may be employed to buffer communication on the serial bus links. Additional registers may also be included to buffer other ports. In some embodiments, SBS 405 may include one or more sequential logic circuits or state machines. Such circuits may be configured to translate message formats between the various ports and the serial link. SBS 405 may, in various embodiments, be incorporate into DMR 401. In other embodiments, SBS 405 may be a separate functional block.

In some embodiments, a configuration register may be located in the SBS such as, e.g., SBS 405 as illustrated in FIG. 4. The configuration register may, in various embodiments, be read from or written to via using the serial bus commands. Individual bits within the configuration register may be set or cleared to control access to the macrocells coupled to SBS 405, such as, e.g., a PE, a DMR, and, if present, the chip I/O port logic (NR) and/or DDR external memory controller, for security purposes and to control macrocell clock rates for dynamic power savings. Additional bits within the configuration registers may be used to reduce leakage power by controlling transistors in series between a power supply and a given macrocell or by activating a substrate bias to transistors within a given macrocell thereby suppressing leakage through the transistors. The configuration register may, in various embodiments, include additional bits for controlling an additional macrocell beyond the basic DMR and PE. For example, the additional macrocell may be an additional layer of routing circuits within an associated DMR.

In various embodiments, the SBS configuration registers may be 21 bits longs, and the low order 20 bits may be used to configure the local macrocells for security and power savings. The $21^{st}$ bit may be a lockout bit may be employed to prevent further changes and thereby secure the configuration until the next chip-wide reset.

The low order 6 bits may, in some embodiments, selectively control clock enables and resets for the local macrocells: PE, DMR, and if present also the chip I/O port logic (NR) and/or DDR external memory controller. The higher order bits may be for selectively disabling local communication ports for security purposes. In some embodiments, bit 6 and bits 16 through 19 may be used to control access to the added $2^{nd}$ router (the B-layer router).

Registers such as those described herein may be a particular embodiment of a storage circuit. In some embodiments, a register may include one or more latches, flip-flop circuits, or other suitable storage circuit, each one configured to store a single data bit. A register may, in some embodiments, store data responsive to a clock edge or other timing signal.

It is noted that the embodiment illustrated in FIG. 4 is merely an example. In other embodiments, different functional blocks and different configurations of functional blocks are possible and contemplated.

Figure 5:
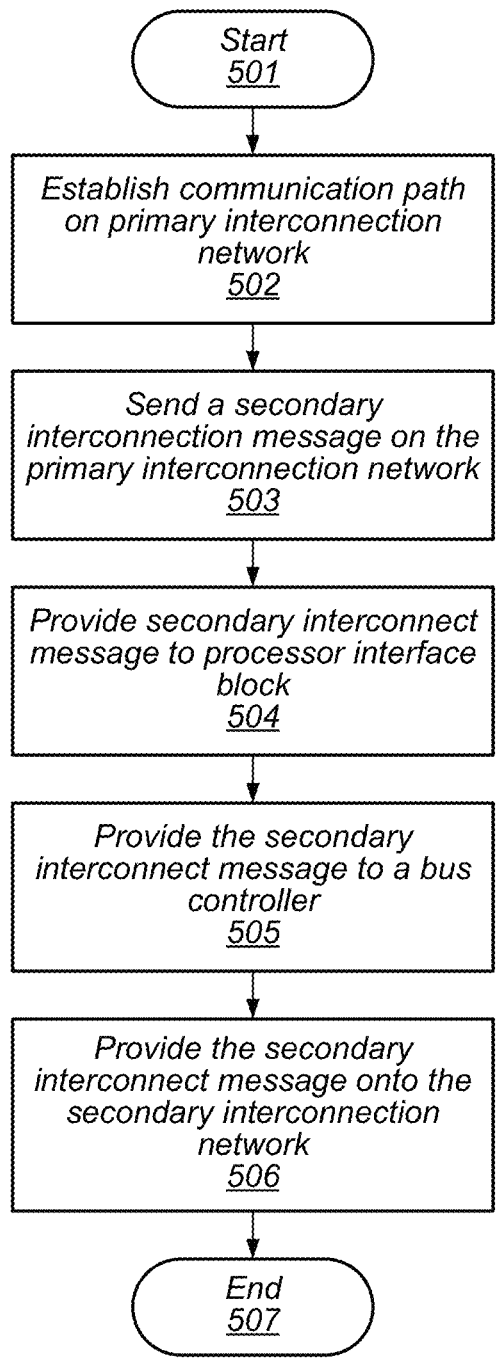
FIG. 5 is a flowchart diagram of one embodiment of a method whereby a processor communicates over the primary interconnection network to access the secondary interconnection network.

Turning to FIG. 5, a flowchart depicting an embodiment of a method whereby a processor initializes communication over the primary interconnection network to access the secondary interconnection network is illustrated. Referring collectively to FIG. 3 and the flowchart illustrated in FIG. 5, the method begins in block 501. A communication path on the primary interconnection network from a processor to a specified router may then be established (block 502). In some embodiments, the specified router, such as, e.g., DMR 0,0 as illustrated in FIG. 3, may be coupled to a processor interface block, such as, Internal PE Interface 302 as depicted in FIG. 3, for example. In some embodiments, the specified router may be coupled to a specified PE, such as, PE 0,0 as illustrated in FIG. 3, for example.

With the communication path established on the PIN, the processor may send one or more second interconnection network (SIN) messages to the specified router (block 503). In some embodiments, the SIN messages may be formatted in accordance with communication protocols employed on the PIN. For example, the SIN messages may be divided into a series of data words where each data word is sent bit parallel on the PIN as a flow control unit (FLIT). The SIN messages may, in various embodiments, be sent in a packet or a series of packets, which may include control or routing information in addition to a data payload containing the one or more SIN messages.

FLITs and packets arriving at the specified router (e.g., DMR 0,0 of FIG. 3) may be forwarded under flow control to the processor interface block (302 of FIG. 3) and buffered in registers. Then control and routing information may be separated from the data payload containing the one or more SIN messages (block 504). In some embodiments, the processor interface block may use the control and routing information from packet headers to establish one or more return paths in the PIN to one or more individual DMR or PEs via the processor interface block's reverse coupling to the specified router.

Once sufficient data to reconstruct the first SIN message arrives in the buffers of the processor interface block, the first SIN message may then be sent in a bit serial fashion to the SIN bus controller (block 503). The first SIN message may then be used to ask the SIN controller whether it is already in use by another controller. If the SIN controller is already in use the processor interface block may use flow control signaling to stall the delivery of FLITS from the coupled DMR and the PIN all the way back to the sending PE. If the SIN controller is not already in use then the FLITs containing the second SIN message may be accepted into the buffers of the processor interface block. In some embodiments, the alternation of accepting and stalling may be used indefinitely. The sending PE may, in various embodiments, additionally insert delays of its own and use these intervals to do other work.

Upon receipt of sufficient FLITS to reconstruct a second SIN message, the processor interface block may then provide the second SIN message, in a bit serial fashion, to a SIN bus controller (block 505). The second SIN message may be used by the SIN controller to initialize a SIN channel to a particular SBS-IU identified with its unique address (block 506).

In some embodiments, the SIN bus controller, such as, e.g., serial bus controller 301 as illustrated in FIG. 3, may be coupled to a boot controller, a debug access port (DAP), an external host interface, and an internal processor interface, examples of which are illustrated in FIG. 3. The SIN bus controller may then arbitrate among various requests from the aforementioned blocks to select and send the secondary interconnection network message onto the secondary interconnection network (block 506). Once the SIN message to initialize a channel on the SIN has reached the intended SBS-IU, the method may conclude in block 507. In some embodiments, a third SIN message request of the SIN controller may be employed to confirm the intended channel was initialized.

In some embodiments, the bus controller may validate commands before they are relayed onto the secondary interconnection network. The validation may be performed by comparing two identical commands sent by two different PEs. In some embodiments, one of the PEs may be a specified or master PE, such as, e.g., PE 0,0 as illustrated in FIG. 3. The timing of the two commands may be controlled by software. In some embodiments, a semaphore mechanism may be employed to ensure that the writes from the two different ports do not collide.

Once the two commands have been stored in the bus controller, the commands may be compared. When the commands match, the command is provided onto the secondary interconnection network. In cases when the commands do not match, no command is provided onto the secondary interconnection network, and may be sent to a programmable error handling unit. Capabilities of the programmable error handling unit may, in various embodiments, include without limitation the ability to report a tamper event, disable I/O circuits, "zeroize" memory, reset the chip, turn off/on clocks or power, or blow fuses to permanently disable one of more features of the chip.

Although the operations of the method illustrated in FIG. 5 are depicted as being performed in a serial fashion, in other embodiments, one or more of the operations may be performed in parallel. Furthermore, in the embodiment of the method described above, a single secondary interconnection network message is sent from a given PE through the PIN to the processor interface block, and then onto the secondary interconnection network through the bus controller. It is noted, however, that the message may originate from any PE included in the multiprocessor array.

Figure 6:
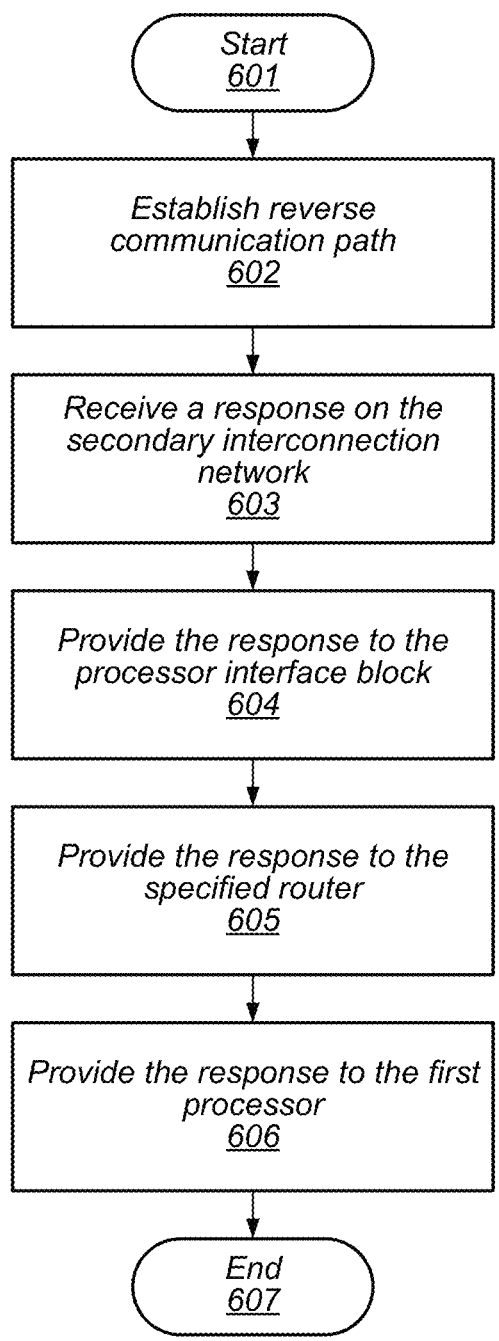
FIG. 6 is a flowchart diagram of one embodiment of a method whereby messages from the secondary interconnection network are provided back to the primary interconnection network for provision to the processor.

An embodiment of a method whereby messages from the secondary interconnection network are provided back to the primary interconnection network for provision to the processor is illustrated in FIG. 6. Referring collectively to FIG. 3 and the flowchart illustrated in FIG. 6, the method begins in block 601. A communication path may then be established from the specified router (e.g., DMR 0,0 of FIG. 3) to a processor (block 602). In some embodiments, the processor may be the processor that originated a secondary interconnection network message, such as the processor described above in regards to FIG. 5.

Once the reverse communication path has been established, a response may be received by a bus controller, such as, e.g., serial bus controller 301 as illustrated in FIG. 3, from a secondary interconnection network (block 603). The received response may then be sent from the bus controller to a processor interface block (block 604). In some embodiments, the processor interface block, such as, e.g., internal PE interface 302 as illustrated in FIG. 3, may include one or more buffers each of which is configured to store received responses received from the secondary interconnection network via the bus controller.

Once the processor interface block has received the response from the bus controller, the processor interface block may relay the response to the specified router, such as, e.g., DMR 0,0 as depicted in FIG. 3 (block 605). The specified router may then initiate the transfer of the response to the target processor (block 606). In some embodiments, the response may travel through one or more routers along the established communication path, before arriving at the destination processor. With the arrival of the response at the destination processor, the method may then conclude in block 607.

It is noted that the method illustrated in FIG. 6 is merely an example. In other embodiments, different operations and different orders of operations may be employed.

In some embodiments, the serial bus does not extend beyond one chip; and so in a multichip system, the several DAP ports may be multiplexed together and software drivers written to operate them. Depending on the communication chain between the multiprocessor chip and the programmer's PC this can be tedious and slow.

Figure 7:
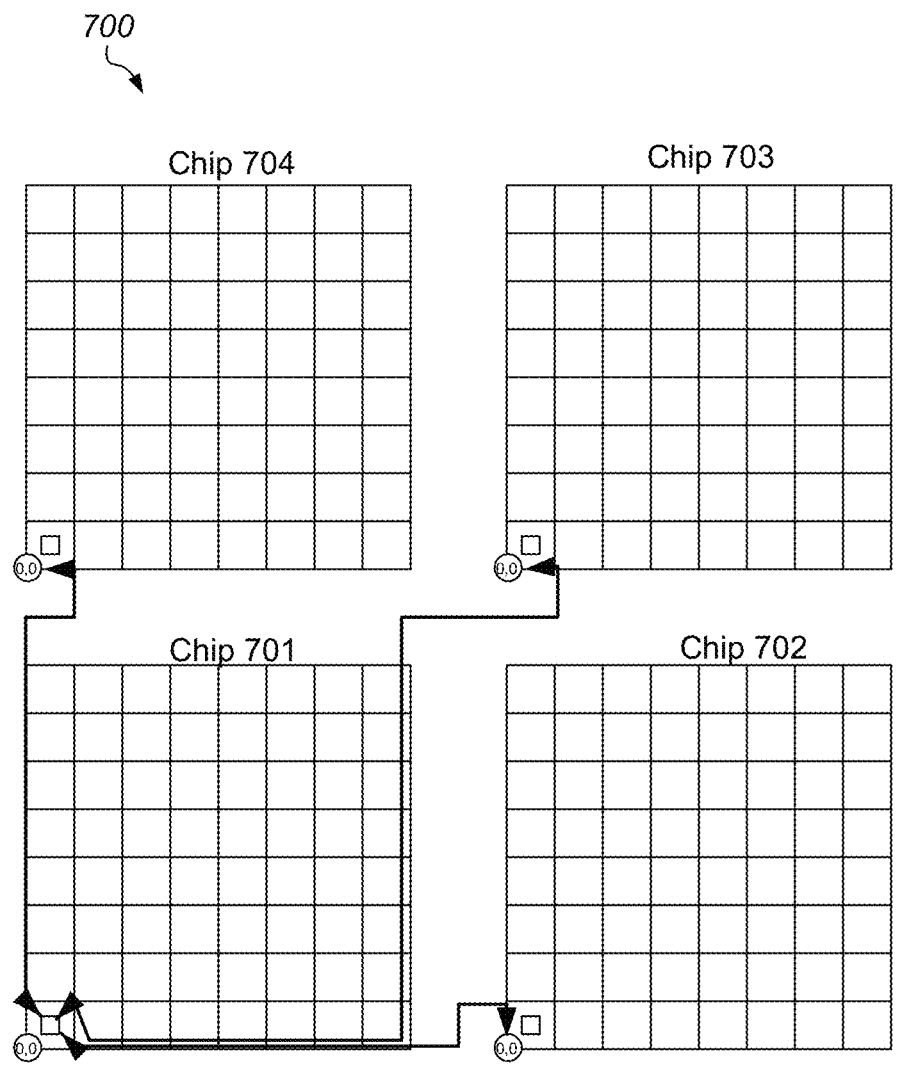
FIG. 7 is a block diagram illustrating a multichip system embodiment whereby primary interconnection network pathways between chips are used to access the secondary interconnection network on remote chips.

Turning to FIG. 7, an embodiment of a multichip system is illustrated which may provide faster communication between chips included in the system. In the illustrated embodiment, chip 701 is coupled to chips 702 through 704. In such multichip systems, a PE on one chip can access the SBC on another chip through the PIN, the target chip DMR 0,0 and the Internal PE Interface (IPEI).

In the embodiment illustrated in FIG. 7, the PE 0,0 of Chip 0 may access the SBCs of the three other chips. Additional chips' SBCs may be accessed until the exit pathways from a PE are filled up, and then additional PEs may be employed. The PIN interchip couplings are not as wire-efficient as a true serial bus port and link between chips, i.e., the PIN port may take 6 to 17 times more parallel wires than a serial bus port but the PIN port can be time-shared for other purposes.

While four chips are depicted in the multichip system illustrated in FIG. 7, in other embodiments, different numbers of chips and different configurations of chips may are possible and contemplated.

Numerous variations and modifications will become apparent to those skilled in the art once the above disclosure is fully appreciated. It is intended that the following claims be interpreted to embrace all such variation and modifications.

What is claimed is:

1. An apparatus, comprising:
a plurality of routers forming a primary interconnection network;
a plurality of interface units coupled together in a daisy chain fashion to form a secondary interconnection network;
a plurality of processors coupled to the plurality of routers in an interspersed fashion, and wherein a first processor of the plurality of processors is configured to generate a message; and wherein a second processor of the plurality of processors is configured to send a response to the message on the secondary interconnection network, wherein the second processor is coupled to a corresponding interface unit of the plurality of interface units; and
a bus controller coupled to a particular interface unit and a particular router, each associated with a particular processor of the plurality of processors, wherein the bus controller is configured to:
receive the response from the particular interface unit via the secondary interconnection network; and
relay the response to particular router; and
wherein the particular router is configured to initiate a transfer of the response to the first processor via an established communication path on the primary interconnection network.

2. The apparatus of claim 1, wherein the bus controller is further configured to buffer the response.

3. The apparatus of claim 1, wherein to initiate the transfer of the response, the particular router is further configured to relay the response to a different router of the plurality of routers, wherein the different router is along the established communication path.

4. The apparatus of claim 3, wherein a given interface unit of the plurality of interface units is configured to:
in response to receiving the response, check the response for an initialization command; and
in response to a determination that the response includes the initialization command, compare an address associated with the response to a hard-wired address associated with the given interface unit.

5. The apparatus of claim 4, wherein the given interface unit is further configured, in response to a determination that the response does not include the initialization command, relay the response to a next interface unit of the plurality of interface units.

6. The apparatus of claim 1, wherein the response includes a plurality of bits, and wherein a subset of the plurality of bits is associated with a command included in the response.

7. A method, comprising:
establishing a communication path on a primary interconnection network formed by a plurality of routers included in a multi-processor system that includes a plurality of processors coupled to the plurality of routers in an interspersed fashion, wherein the communication path identifies a subset of the plurality of routers;
generating a message by a first processor of the plurality of processors;
generating a response to the message by a second processor of the plurality of processors;
sending the response to a bus controller via a secondary interconnection network formed by a plurality of interface units coupled together in a daisy chain fashion, wherein the bus controller is coupled to a particular interface unit of the plurality of interface units and a particular router of the plurality of routers, wherein the particular interface unit and the particular router are each associated with a particular processor of the plurality of processors;
receiving, by the bus controller, the response via the secondary interconnection network;
relaying, by the bus controller, the response to the particular router; and
initiating, by the particular router, a transfer of the response to the first processor via the primary interconnection network.

8. The method of claim 7, further comprising buffering the response by the bus controller.

9. The method of claim 7, wherein initiating the transfer of the response includes relaying, by the particular router, the response to a different router included in the subset of the plurality of routers.

10. The method of claim 9, further comprising:
receiving, by a given interface unit of the plurality of interface units, the response;
checking, by the given interface unit, the response for an initialization command; and
in response to determining that the response includes the initialization command, comparing an address included in the response to a hard-wired address associated with the given interface unit.

11. The method of claim 10, further comprising, in response to determining the response does not include the initialization command, relaying, by the given interface unit, the response to a different interface unit of the plurality of interface units.

12. The method of claim 7, wherein the response includes a plurality of bits, and wherein a subset of the plurality of bits is associated with a command included in the response.

13. The method of claim 7, further comprising sending, by the first processor, the message to the second processor via the primary interconnection network.

14. An apparatus, comprising:
a first integrated circuit chip including a first bus controller coupled to a first secondary interconnection network, a first plurality of routers forming a first primary interconnection network and a first plurality of processors coupled to the first plurality of routers in an interspersed fashion; and a second integrated circuit chip including a second plurality of processors that includes a particular processor configured to send a message to the first bus controller via an inter-chip interconnect; and wherein the first integrated circuit chip is further configured to send, to a second bus controller included in the second integrated circuit chip, a response to the message via the inter-chip interconnect.

15. The apparatus of claim 14, wherein the second integrated circuit chip includes a second plurality of routers forming a second primary interconnection network, wherein the second plurality of routers is coupled to the second plurality of processors in an interspersed fashion.

16. The apparatus of claim 15, wherein the first integrated circuit chip further includes a plurality of interface units that form a first secondary interconnection network.

17. The apparatus of claim 16, wherein the first bus controller is further configured to initiate a transfer of the message to a target processor of the first plurality of processors using the first secondary interconnection network.

18. The apparatus of claim 17, wherein the first bus controller is further configured to arbitrate a plurality of requests to a particular interface unit of the plurality of interface units, wherein the plurality of requests originate from a plurality of circuit blocks.

19. The apparatus of claim 18, wherein the plurality of circuit blocks includes a processor interface circuit, and a boot controller circuit.

20. The apparatus of claim 19, wherein the inter-chip interconnect is formed by coupling the first primary interconnection network to the second primary interconnection network.

* * * * *